United States Patent Office 2,953,564
Patented Sept. 20, 1960

2,953,564

PHENYL DERIVATIVES OF 5-NITROFURO-GUANAMINE

William R. Sherman, Waukegan, Ill., assignor to Abbott Laboratories, Chicago, Ill., a corporation of Illinois No Drawing. Filed Dec. 29, 1958, Ser. No. 783,169

5 Claims. (Cl. 260—249.9)

This invention relates to novel compounds represented by the formula:

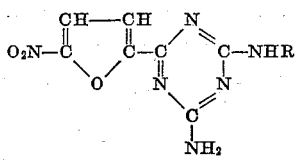

In this and succeeding formulas, R represents phenyl, loweralkylphenyl, nitrophenyl or halophenyl. The term "loweralkylphenyl" as employed herein refers to a phenyl radical substituted by an alkyl group containing from 1 to 4 carbon atoms, inclusive. The term "halophenyl" refers to a phenyl radical substituted in the ortho, meta or para positions by chlorine, bromine, fluorine or iodine. In like manner, the nitro group or loweralkyl group may be substituted on the phenyl ring in the ortho, meta or para positions but the ortho and para positions are preferred. These compounds are crystalline solids which are moderately soluble in many organic solvents but only slightly soluble in water. They have been found to be useful as parasiticides and are adapted to be employed in liquid and dust compositions for the control of the growth of fungi and bacteria such as *Escherichia coli*.

The new compounds may be prepared by the reaction of methyl 5-nitro-2-furoate and an aryl diguanide represented by the formula:

The reaction proceeds smoothly at temperatures of from 20° C. to the boiling temperature of the reaction mixture. In a preferred method of operation, the reaction is carried out in the presence of an inert organic solvent such as ethyleneglycolmonomethylether or ethanol. Good results are obtained when employing substantially equimolecular proportions of the reactants.

In carrying out the reaction, the methyl 5-nitro-2-furoate and aryl diguanide are dissolved in the solvent and the resulting mixture allowed to stand at or about room temperature or heated preferably at the boiling temperature and under reflux for a sufficient period of time to complete the reaction. The precipitate which forms during the reaction or upon cooling the reaction mixture is separated in a conventional manner such as by filtration or decantation. The desired triazine product may be further purified by recrystallization from a suitable organic solvent.

The following examples are presented to illustrate but not limit the invention:

EXAMPLE I 2-amino-4-anilino-6-(5-nitro-2-furyl)-1,3,5-triazine

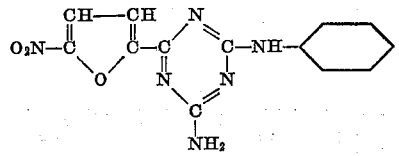

$N^1$-phenyldiguanide (17.7 grams, 0.10 mole) and methyl 5-nitro-2-furoate (17.1 grams, 0.10 mole) were dissolved in 100 ml. of ethyleneglycolmonomethylether and the resulting mixture heated on a steam bath for 3.5 hours. The reaction mixture was then allowed to stand for three days during which time the desired 2-amino-4-anilino-6-(5-nitro-2-furyl)-1,3,5-triazine precipitated as a crystalline solid. This product was separated by filtration and after successive recrystallizations from dimethylformamide and butanol melted at 259°–260° C.

*Analysis.*—Calcd. for $C_{13}H_{10}O_3N_6$: C=52.35%; H=3.38%; N=28.18%. Found: C=52.53%; H=3.50%; N=28.04%.

EXAMPLE II

2 - amino - 4 - (orthotoluidino) - 6 - (5 - nitro - 2 - furyl)-1,3,5-triazine

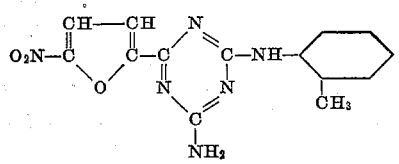

Methyl 5-nitro-2-furoate (8.55 grams; 0.05 mole) and $N^1$-(orthotolyl)-diguanide (9.95 grams, 0.05 mole) were dissolved in 30 ml. of ethyleneglycolmonomethylether and the resulting mixture allowed to stand at room temperature for five days. The solid which precipitated was separated by filtration and washed with alcohol to obtain 2-amino-4-(orthotoluidino)-6-(5-nitro-2-furyl)-1,3,5-triazine which after recrystallization from butanol was found to melt at 257° C. with decomposition.

*Analysis.*—Calcd. for $C_{14}H_{12}O_3N_6$: C=53.84%; H=3.38%; N=28.18%. Found: C=52.53%; H=3.50%; N=26.71%.

EXAMPLE III

2 - amino - 4 - (paranitronanilino) - 6 - (5 - nitro - 2-furyl)-1,3,5-triazine

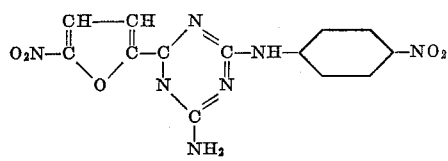

A solution of $N^1$-(paranitrophenyl)-diguanide (12.93 grams, 0.05 mole) and methyl 5-nitro-2-furoate (8.55 grams, 0.058 mole) in 100 ml. of absolute ethanol was heated at the boiling temperature and under reflux for 6 hours. The solid which precipitated was removed by filtration, crystallized from a dimethylformamide-water mixture and dried under vacuum at a temperature of 153° C. As a result of these operations, there was obtained 2-amino-4-(paranitroanilino)-6-(5-nitro-2-furyl)-1,3,5-triazine which melted at 339° C.

*Analysis.*—Calcd. for $C_{13}H_9O_5N_7$: C=45.48%; H=2.65%; N=28.56%. Found: C=45.25%; H=2.86%; N=28.72.

EXAMPLE IV

*2 - amino - 4 - (parachloroanilino) - 6 - (5 - nitro - 2-furyl)-1,3,5-triazine*

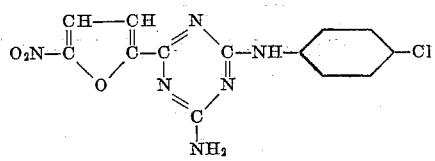

A mixture of 10.58 grams (0.5 mole) of $N^1$-(parachlorophenyl)-diguanide, 8.55 grams (0.05 mole) of methyl 5-nitro-2-furoate and 30 ml. of ethyleneglycolmonomethylether was allowed to stand at room temperature for two days. At the end of this period of time, a yellow solid had precipitated which was separated by filtration and recrystallized from a mixture of dimethylformamide and water. The solid product was dried at 153° C. under vacuum to obtain the above-named triazine compound which melted at 248°–249° C. and analyzed as follows:

*Analysis.*—Calcd. for $C_{13}H_9ClN_6O_3$: C=46.95%; H=2.72%; Cl=10.66%. Found: C=47.13%, H=2.72%; Cl=10.64%.

EXAMPLE V

*2 - amino - 4 - (parabromoanilino) - 6 - (5 - nitro - 2-furyl)-1,3,5-triazine*

This compound is prepared by the reaction of $N^1$-(parabromophenyl)-diguanide and methyl 5-nitro-2-furoate in the same manner as that described in Example IV. The product has a molecular weight of 377.

By employing the procedure described in the foregoing examples, other triazine compounds can be prepared as follows:

2 - amino - 4 - (paratoluidino) - 6 - (5 - nitro - 2 - furyl)-1,3,5-triazine,
2 - amino - 4 - (orthonitroanilino) - 6 - (5 - nitro - 2-furyl)-1,3,5-triazine,
2 - amino - 4 - (orthochloroanilino) - 6 - (5 - nitro - 2-furyl)-1,3,5-triazine,
2 - amino - 4 - (metabromoanilino) - 6 - (5 - nitro - 2-furyl)-1,3,5-triazine,
2 - amino - 4 - (metatoluidino) - 6 - (5 - nitro - 2 - furyl)-1,3,5-triazine, and
2 - amino - 4 - (parafluoroanilino) - 6 - (5 - nitro - 2-furyl)-1,3,5-triazine by the reaction of methyl 5-nitro-2-furoate with $N^1$-(paratolyl)-diguanide,
$N^1$-(orthonitrophenyl)-diguanide,
$N^1$-(orthochlorophenyl)-diguanide,
$N^1$-(metabromophenyl)-diguanide,
$N^1$-(metatolyl)-diguanide or
$N^1$-(parafluorophenyl)-diguanide, respectively.

The compounds of the present invention have been found to be useful particularly as antibacterial agents. For such use, the products may be dispersed in liquid or on solid carriers with or without the aid of a wetting agent and employed as sprays or dusts. In other procedures, the products may be employed as constituents of oil-in-water emulsions or water dispersions with or without the aid of wetting, dispersing or emulsifying agents. In representative operations, complete inhibition of the growth of *Micrococcus pyogenes* var. *aureus* and *Escherichia coli* was obtained with an aqueous composition containing 25 parts by weight of 2-amino-4-(parachloroanilino)-6-(5-nitro-2-furyl)-1,3,5-triazine per million parts by weight of ultimate mixture.

I claim:
1. A triazine compound represented by the formula:

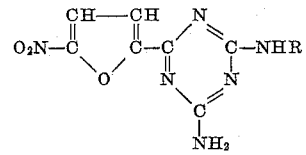

wherein R represents a member selected from the group consisting of phenyl, tolyl, nitrophenyl and halophenyl.
2. 2-amino-4-anilino-6-(5-nitro-2-furyl)-1,3,5 - triazine.
3. 2-amino-4-(orthotoluidino)-6-(5-nitro-2-furyl)-1,3,5-triazine.
4. 2-amino-4-(paranitroanilino)-6-(5-nitro - 2 - furyl)-1,3,5-triazine.
5. 2-amino-4-(parachloroanilino)-6-(5-nitro - 2 - furyl) 1,3,5-triazine.

References Cited in the file of this patent

UNITED STATES PATENTS

| | | |
|---|---|---|
| 2,535,968 | Thurston et al. | Dec. 26, 1950 |
| 2,885,400 | Schock | May 5, 1959 |

OTHER REFERENCES

Chemical Abstracts: vol. 45, p. 10302 (1951) [abstract of Ikegati, Japan J. Pharm. and Chem., vol. 22, pp. 293–300 (1951)].

Dunlop et al.: The Furans, ACS Monograph Series No. 119, p. 164, Reinhold Publishing Corp., 1953.

UNITED STATES PATENT OFFICE
CERTIFICATION OF CORRECTION

Patent No. 2,953,564  September 20, 1960

William R. Sherman

It is hereby certified that error appears in the above numbered patent requiring correction and that the said Letters Patent should read as corrected below.

Column 2, line 45, for "3.38%; N=28.18%. Found: C=52.53%; H=3.50%;" read -- 3.87%; N=26.91%. Found: C=53.78%; H=3.74%; --; lines 53 to 58, the center portion of the formula should appear as shown below instead of as in the patent:

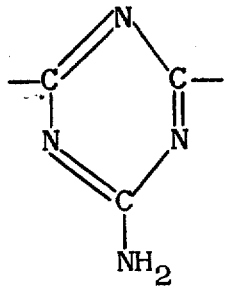

column 3, line 12, for "(0.5 mole)" read -- (0.05 mole) --.

Signed and sealed this 9th day of May 1961.

(SEAL)
Attest:

ERNEST W. SWIDER
Attesting Officer

DAVID L. LADD
Commissioner of Patents